2,096,313

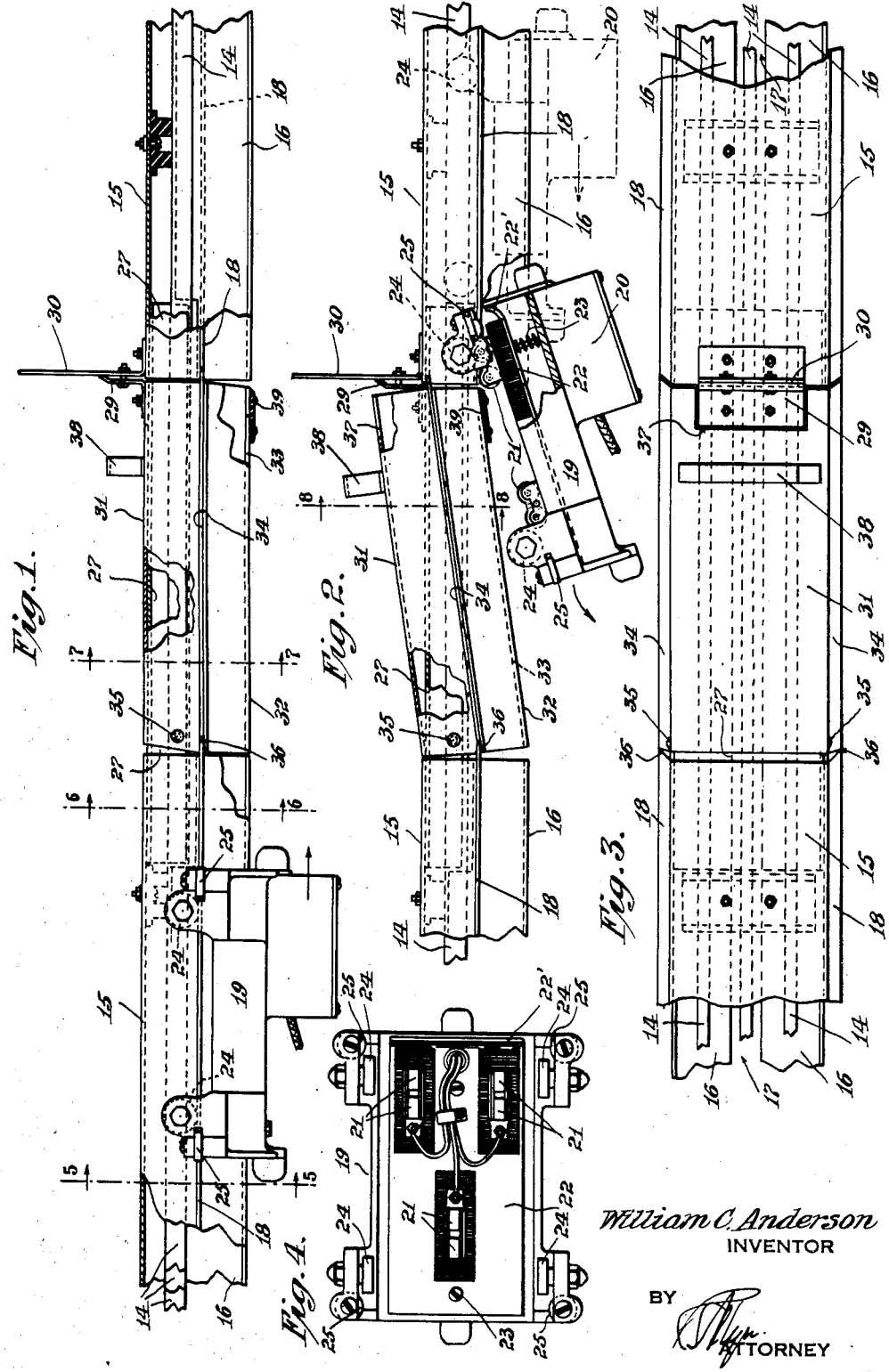

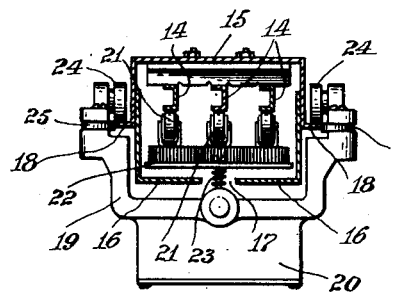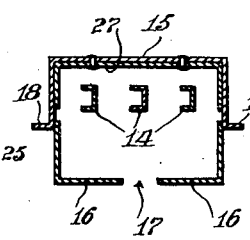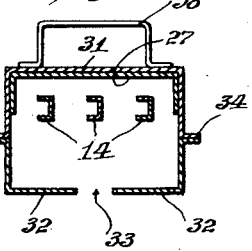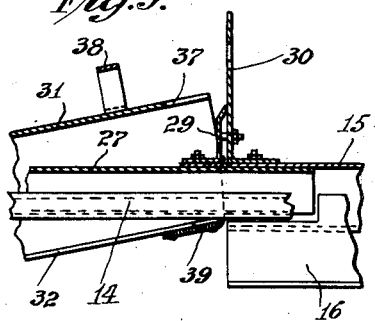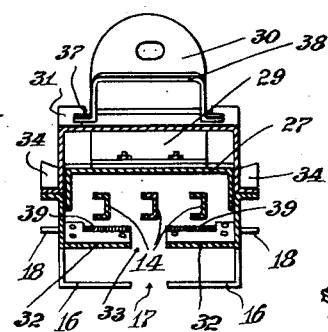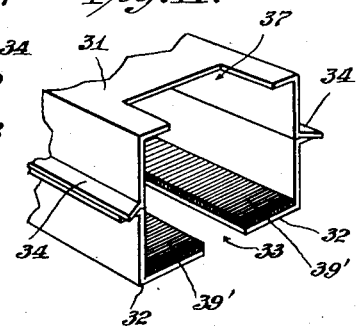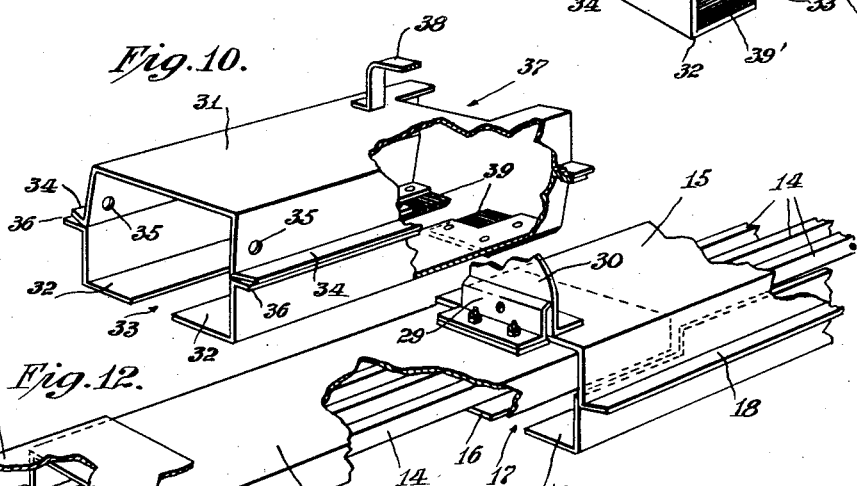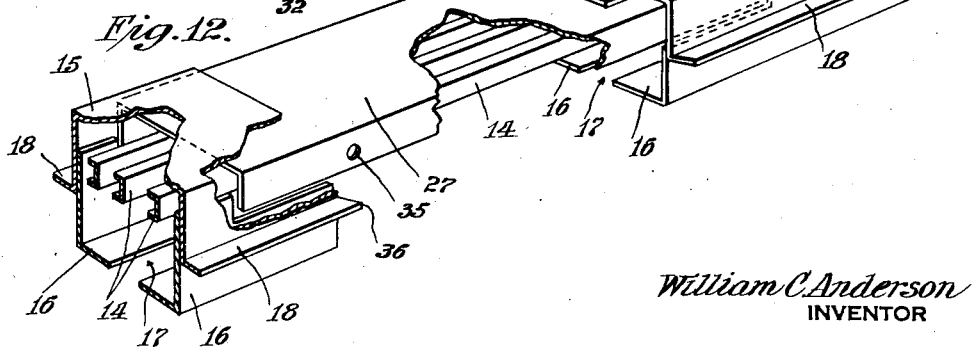
William C. Anderson
INVENTOR Patented Oct. 19, 1937

UNITED STATES PATENT OFFICE 2,096,313

BUS BAR CONDUIT SYSTEM

William Chester Anderson, Bromley, Ky., assignor to The Trumbull Electric Manufacturing Company, Plainville, Conn., a corporation of Connecticut Application October 3, 1936, Serial No. 103,821

8 Claims. (Cl. 247—3)

My invention relates to systems and apparatus of the general character set forth in the application of Frank Harvey, Serial Number 62,213, filed February 3, 1936. In such systems the bus bars are suitably supported in steel conduits or housings and the current take-off or branch connection to the current consuming device is effected through a trolley device which is adapted to be moved from point to point along the conduit.

It is highly desirable that means be provided for applying and removing the trolley device.

The main object of my invention is to provide a convenient, safe and practical construction for this purpose.

Another object is to provide a construction of the character described in which it is impossible to accidentally reverse the polarity of the connection.

Another object is to provide a construction which is rugged and unlikely to get out of order.

In the system for which my invention is especially applicable the conduit consists of a main upper portion of inverted U-shape and a lower portion having a slot for the trolley. Guide tracks extend laterally from the sides of the conduit and the trolley device has supporting and guide rollers which coact with these tracks on the outside of the conduit and contact rollers which coact with the bus bars within the conduit.

In order to facilitate the application of the trolley device to the conduit, I provide at intervals in the length of the conduit gate sections each of a cross section substantially identical with the cross section of the main stationary part of the conduit. This gate section is hinged to the main part of the conduit on an axis transverse to the conduit and parallel with the plane of the trolley slot. Normally the gate section is supported by a channel member having side plates which connect adjacent ends of the stationary conduit sections. The gate section is hinged at one end to the side plates of this channel member and its other end is adapted to be raised to provide an opening in the bottom of the conduit for the application of the trolley device.

Fig. 1 is a side view of a fragment of a bus bar conduit system of my invention showing a trolley and a gate for permitting the insertion and removal of the trolley from the conduit, parts of the conduit being broken away and sectioned to show the interior.

Fig. 2 is a similar side view showing the gate open and the trolley being inserted (or removed).

Fig. 3 is a plan view of a fragment of the conduit and a gate.

Fig. 4 is a plan view of the trolley.

Fig. 5 is a cross sectional view on the plane of the line 5—5 of Fig. 1.

Fig. 6 is a cross sectional view on the plane of the line 6—6 of Fig. 1.

Fig. 7 is a cross sectional view on the plane of the line 7—7 of Fig. 1.

Fig. 8 is a cross sectional view on the plane of the line 8—8 of Fig. 2.

Fig. 9 is a longitudinal sectional view showing the gate and adjacent conduit end.

Fig. 10 is a perspective view of the gate, partly in section.

Fig. 11 is a perspective view of one end of the gate.

Fig. 12 is a perspective view of the conduit without the gate.

The construction is illustrated and will be described generally as installed overhead and this is the usual and most convenient arrangement. It will be obvious however that sections of such a system might be otherwise arranged.

As shown, the bus bars 14 are suitably supported in the housing or conduit which is made up of an upper or main inverted U-shape section 15 and a lower section consisting of angle plates 16 secured to the upper section and leaving a slot 17 in the lower face for the electric connection.

The conduit is provided with laterally projecting flanges 18 which serve as tracks for the trolley device. These flanges are preferably integral with the upper section of the conduit. The lower parts 16, 16 are suitably secured to the upper section by welding or in any other suitable manner.

The trolley device 19 has a fuse box 20 provided with suitable means of connection to the branch cable. The contact rollers 21 are supported by a plate 22 which is pressed upward from the body of the trolley by springs 23 at opposite ends. The contact rollers are preferably arranged as shown in Fig. 4 with two pairs of rollers at one end and a single pair of rollers at the other end. These are, of course, laterally spaced so as to correspond with the spacing of the bus bars 14.

The trolley is supported by rollers 24 at each corner which rest on the upper faces of the track 18. The trolley device is also provided with guide rollers 25 at each corner which coact with the side edges of the tracks 18 as shown in Fig. 5.

At the point where it is desired to attach or detach the trolley a gateway is provided which is bridged by a connecting channel member 27 whose ends are connected to the adjacent ends of the main channel sections of the conduit. One end of the bridge piece 27 may be welded as at 28 in Fig. 12 and the other end connected by an angle piece 29 to the hanger 30 which is carried by the adjacent end of the right hand channel section of the conduit.

The gate is constructed in a manner similar to the remainder of the conduit and its cross section is the same or substantially the same as the cross section of the main conduit. The gate consists of the upper channel portion 31 with the two angle pieces 32 leaving a trolley slot 33 below. This gate has side flanges 34 constituting tracks which are normally in alignment with the tracks of the adjacent stationary conduit sections. One end of the gate is hinged at 35 to the side plates of the bridge channel 27 and the ends of the gate are cut away so as to permit the gate to swing up from the position of Fig. 1 to the position of Fig. 2.

The position of Fig. 1 may be regarded as the closed position of the gate where it acts as a part of the conduit system adapted to permit the trolley to be moved back and forth. The position of the gate shown in Fig. 2 may be regarded as the open position. It permits the application and removal of the trolley. The ends of the track sections of the gate are overlapped as indicated at 36 to provide a better support for the trolley.

The upper movable end of the gate is cut away at 37 to clear the angle piece 29 (see Figs. 10 and 12). Handle 38 is provided to facilitate the opening and closing of the gate. The bottom of the swinging end of the gate is provided with insulating plates 39 either applied as shown in Fig. 10 or inserted as shown at 39' in Fig. 11, so as to prevent short circuiting of the bus bars when the gate is open.

The end 22' of the contact supporting plate 22 is preferably curved upward as shown in Fig. 2 to facilitate application of the trolley.

To apply the trolley to the conduit it is merely necessary to raise the gate as shown in Fig. 2 and then apply the trolley by inserting it endwise on to the right hand conduit section so that the rollers 24 rest on the tracks 18. The trolley is then pushed to the right and the rear rollers 24 similarly applied to the track sections 18. It is necessary to apply the trolley device in a manner shown in Fig. 2 in order that the centrally located contact rollers may extend up into the slot 33 in the gate section. When the trolley device has been applied the gate is closed whereupon the trolley may be moved back and forth to any desired position in the conduit. To remove the trolley the operation is reversed as will be obvious from the foregoing.

It will be seen that this construction is simple, compact, inexpensive and very strong. If an attempt is made to insert the trolley with the polarity reversed, that is, with the single central contact roller inserted first, the two lateral or paired contact rollers will strike the bottom of the conduit gate so that the trolley cannot be lifted into the horizontal position which it must take in order to be applied to the conduit.

Although I have shown the preferred construction and arrangement of the parts it should be understood that modifications may be made without departing from the spirit or scope of my invention.

I claim:

1. A bus bar conduit system having conduit sections with a longitudinal slot in one face, bus bars within and insulated from said sections, a gate section surrounding said bus bars, aligned track flanges on said gate and conduit sections, said gate section having its slotted face adapted to be swung at one end toward said bus bars, insulating material adjacent the slotted face of said gate to prevent short circuiting said bus bars by contact between the bus bars and the slotted face of said gate when opened.

2. A bus bar conduit system having conduit sections with a longitudinal slot in one face, a bus bar within and insulated from said sections, a gate section movable laterally of said conduit sections and toward said bus bar to open far enough to allow the insertion of a trolley contact within an adjacent section.

3. A bus bar conduit system having conduit sections with a longitudinal slot in one face, a plurality of bus bars within and insulated from said sections, a gate section adapted to be swung at one end toward said bus bars and insulating material between the bus bars and gate section when opened whereby the bus bars may limit the opening movement of the gate.

4. A bus bar conduit system having conduit sections with a longitudinal slot in one face, bus bars within and insulated from said sections, a gate section surrounding said bus bars, aligned track flanges on said gate and conduit sections, said gate section having its slotted face adapted to be swung at one end toward said bus bars, insulating material adjacent the slotted face of said gate to prevent short circuiting said bus bars by contact between the bus bars and the slotted face of said gate when opened, the end of said gate adjacent said insulating material being cut away to allow said swinging gate movement to take place about a pivotal axis intermediate the slotted face of the gate and the side opposite thereto.

5. A bus bar conduit system having conduit sections with a longitudinal slot in one face, bus bars within and insulated from said sections, a gate section surrounding said bus bars, aligned track flanges on said gate and conduit sections, said gate section having its slotted face adapted to be swung at one end toward said bus bars, insulating material adjacent the slotted face of said gate to prevent short circuiting said bus bars by contact between the bus bars and the slotted face of said gate when opened, and means intermediate the longitudinal ends of said gate section for supporting said bus bars independently thereof, the face of the gate section adjacent said means being recessed to receive said supporting means.

6. A bus bar conduit system having conduit sections with a longitudinal slot in one face, bus bars within and insulated from said sections, a gate section surrounding said bus bars, aligned track flanges on said gate and conduit sections, said gate section having its slotted face adapted to be swung at one end toward said bus bars, insulating material adjacent the slotted face of said gate to prevent short circuiting said bus bars by contact between the bus bars and the slotted face of said gate when opened, the track flanges of said gate sections and the track flanges of an adjacent conduit section overlapping at the end portion of the gate about which said swinging movement takes place.

7. A bus bar conduit system having conduit sections with a longitudinal slot in one face and guide tracks projecting laterally of the sides, a plurality of bus bars within and insulated from said sections, a gate section adapted to be moved at at least one end toward said bus bars to open the gate, a trolley having supporting and guide rollers movable on the top and edges of said tracks on the outside of said conduit sections, contacts supported by said trolley for cooperation with said bus bars within the conduit sections, a support for said contacts adapted to travel within said conduit sections, said trolley being constructed so as to permit insertion in a tilted position into said conduit when the gate is opened.

8. A bus bar conduit system having conduit sections with a longitudinal slot in one face, a bus bar within and insulated from said sections, a gate section movable laterally of said conduit sections and toward said bus bar to open far enough to allow the insertion of a trolley contact within an adjacent section, said gate section movement being effected by swinging one end thereof about a pivot center adjacent the opposite end of the gate section, the ends of the gate section and the ends of the adjacent conduit sections being separated enough at diagonally opposite end edges to allow swinging movement of the gate to take place when the sides of the gate section are substantially aligned with the sides of the conduit sections.

WILLIAM CHESTER ANDERSON.